United States Patent
Takase et al.

[15] 3,704,703
[45] Dec. 5, 1972

[54] COOKING OVEN

[72] Inventors: Tadayoshi Takase, Nishikamo-gun; Sueo Mizuno, Higashikasugai-gun, both of Japan

[73] Assignee: Kabushiki Kaisha Rinnai Seisakusho, Nogoya-shi, Japan

[22] Filed: March 29, 1971

[21] Appl. No.: 128,849

[30] Foreign Application Priority Data

Oct. 5, 1970   Japan..................................45/98156

[52] U.S. Cl. .............................126/39 C, 126/273 R
[51] Int. Cl. .................................................F24c 3/00
[58] Field of Search......126/200, 273 R, 39 C, 273 A

[56] References Cited

UNITED STATES PATENTS

| | | |
|---|---|---|
| 2,186,803 | 1/1940 | Goerg..............................126/200 X |
| 2,428,987 | 10/1947 | Pellegrin..............................126/200 |
| 3,128,363 | 4/1964 | Rose et al..........................126/200 X |
| 3,499,431 | 3/1970 | McArthur............................126/39 C |

FOREIGN PATENTS OR APPLICATIONS 1,356,622   2/1964   France................................126/39 C

*Primary Examiner*—Carroll B. Dority, Jr.
*Attorney*—Waters, Roditi, Schwartz & Nissen

[57] ABSTRACT

An oven has a heating chamber with a front door providing access thereto and beneath a separating plate at the bottom of the heating chamber is a burner chamber containing a burner. The separating plate has an opening above the burner and a detachable cover is mounted at the opening and has a window of heat-resistant plate glass to permit viewing of the burner and its condition of operation.

5 Claims, 2 Drawing Figures

PATENTED DEC 5 1972					3,704,703

INVENTOR
Sueo Mizuno
BY Tadayoshi Takase

COOKING OVEN

BRIEF SUMMARY OF THE INVENTION

The invention relates to a cooking oven and particularly to an improved oven which provides viewing of the burner and its condition of operation.

An object of the invention is to provide an oven construction by which observation of the burner can be made without interfering with the burner operation.

In the oven according to the invention, a separating plate between a burner chamber and a heating chamber is provided with an opening and a detachable cover is mounted at the opening and has a window of heat-resistant glass plate therein to provide visibility of the interior of the burner chamber and enable viewing the condition of operation of the burner within the heating chamber.

DETAILED DESCRIPTION

Figure 1:
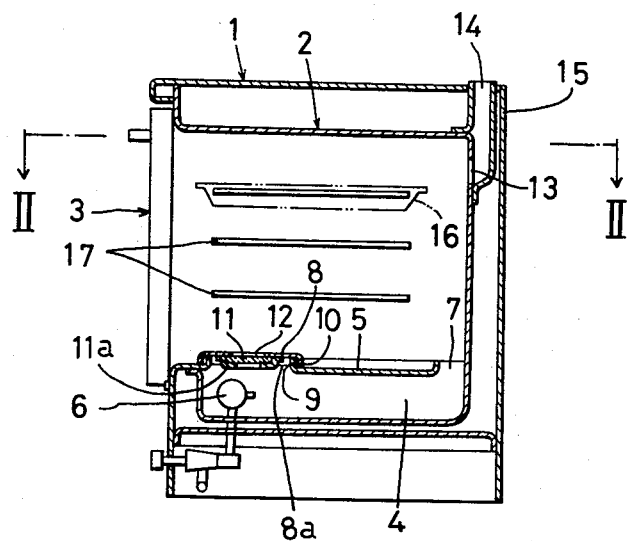
FIG. 1 is a side elevational view in cross-section of a cooking oven according to the invention.
Figure 2:
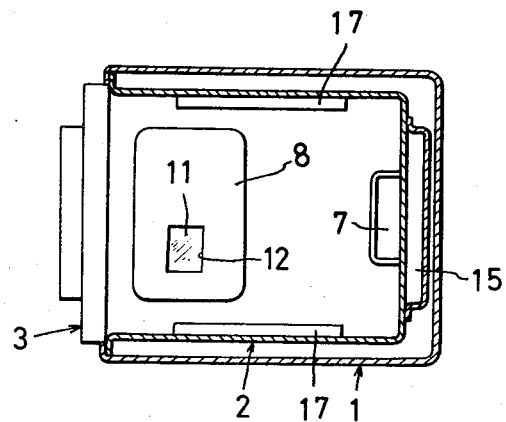
FIG. 2 is a sectional view taken along line II—II in FIG. 1.

Referring to the drawing, therein is seen an oven having an outer casing 1, and numeral 2 denotes an inner casing defining a heating chamber whose front is open so as to permit introduction and removal of foodstuffs through an openable door at the opening of the heating chamber. Numeral 4 denotes a burner chamber below a separating plate 5 in the inner casing 2 and a burner 6 is contained within burner chamber 4. At the rear of the burner chamber 4 is an opening 7 leading to the interior of the heating chamber 2 for passage of heated air to the heating chamber 2. The plate has an opening 8a above the burner 6 to permit service of the burner and a detachable cover 8 is mounted on plate 5. The plate 5 has a lip 9 bent upwards at the periphery of opening 8a and the cover 8 has a lip 10 bent downwards so as to engage and surround the lip 9 whereby entry of water, oil, fat or the like into the opening 8a can be prevented. The cover 8 is provided with a window 12 having a heat-resisting glass plate 11 mounted in a frame 11a thereof so as to permit viewing the burner 6 and the condition of operation thereof.

The inner casing 2 is provided on its rear wall with an exhaust gas opening 13, and an exhaust gas conduit 15, which is open at 14 to the exterior, is attached thereto. Several pairs of ridges 17 are provided on the walls of casing 2 for receiving a cooking or baking plate 16 as shown in chain dotted lines in FIG. 1.

When the burner 6 is fired by a firing apparatus (not shown), the firing condition can be observed and confirmed through the glass plate 11 of the window 12 without removal of the cover 8. Accordingly, there is eliminated the disadvantage associated with conventional ovens, in which an observation opening having a cover is made in the bottom plate, that the opening must be closed each time after observation because, otherwise, the heated air within the heating chamber would draw through the opening into the burning chamber to adversely influence the burning of the gas. Additionally, the window 12 in the detachable cover 8, enables easy cleaning thereof by removal of cover 8. In the case where the door 3 is provided with an observation window, the firing condition can be observed with the door closed which is particularly easy and safe.

What is claimed is:

1. An oven comprising a heating chamber, a burner chamber below the heating chamber, a separating plate between the heating chamber and the burner chamber, said plate having an opening therein, a burner in said burner chamber below said opening, and a detachable cover supported on the separating plate for covering said opening, said cover having a window of light permeable material therein for viewing the interior of said burner chamber, said separating plate including an upwardly deformed lip surrounding said opening and said cover including a corresponding downwardly deformed lip engageable around the lip on the separating plate to cover the same.

2. An oven as claimed in claim 1 wherein said heating chamber is open at the front and said oven comprises an openable door closing the front of the heating chamber, said separating plate having an opening at the rear thereof for passage of heated air from said burner chamber into said heating chamber.

3. An oven as claimed in claim 2 comprising air exhaust means leading from said heating chamber to the exterior of the oven.

4. An oven as claimed in claim 3 wherein said air exhaust means comprises an outlet conduit leading from the heating chamber to the exterior of the oven.

5. An oven as claimed in claim 4 wherein said outlet conduit is at the rear of the heating chamber.

* * * * *